(12) United States Patent
Rao

(10) Patent No.: US 7,539,203 B2
(45) Date of Patent: May 26, 2009

(54) MULTIPLE CHANNEL FLOW CONTROL WITH FIRST-IN-FIRST-OUT (FIFO) READ/WRITE RANDOM ACCESS MEMORY (RAM)

(75) Inventor: Rajesh B. R. Rao, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 10/854,655

(22) Filed: May 26, 2004

(65) Prior Publication Data

US 2005/0265379 A1 Dec. 1, 2005

(51) Int. Cl.
*H04L 12/28* (2006.01)

(52) U.S. Cl. .................. 370/412; 370/401; 370/235; 370/905; 711/104

(58) Field of Classification Search ............... 710/305; 711/104
See application file for complete search history.

(56) References Cited

U.S. PATENT DOCUMENTS

| 7,111,102 B2* | 9/2006 | Doak et al. ............... 710/305 |
| 7,230,917 B1* | 6/2007 | Fedorkow et al. ......... 370/229 |
| 2002/0141450 A1* | 10/2002 | Duvvuru ................. 370/476 |
| 2004/0032827 A1* | 2/2004 | Hill et al. ................ 370/229 |
| 2004/0037313 A1* | 2/2004 | Gulati et al. ............. 370/465 |

* cited by examiner

*Primary Examiner*—Duc C Ho
(74) *Attorney, Agent, or Firm*—Blakely, Sokoloff, Taylor & Zafman LLP

(57) ABSTRACT

According to embodiments of the present invention, a data source provides data on multiple channels to a data sink. In embodiments, each channel shares the same random access memory (RAM)-based flow control and has first-in-first-out (FIFO) read/write.

12 Claims, 5 Drawing Sheets

FIGURE 3
204

| | Byte Counter | | | | X | Stream Counter | | Bank 0 | | Bank 1 | | Bank 2 ... | | Bank N | |
|---|---|---|---|---|---|---|---|---|---|---|---|---|---|---|---|
| | 199 | | | | | | | | | | | | 0 | | |
| | Bit | Bit | Bit | Bit | | Bit | Bit | 4 Bytes | 4 Bytes | 4 Bytes | 4 Bytes | 4 Bytes | 4 Bytes | 4 Bytes | 4 Bytes |
| FIFO ROW 0 | | | | | | | | | | | | | | | |
| FIFO ROW 1 | | | | | | | | | | | | | | | |
| FIFO ROW 2 | | | | | | | | | | | | | | | |
| FIFO ROW 3 | | | | | | | | | | | | | | | |
| FIFO ROW 4 | | | | | | | | | | | | | | | |
| FIFO ROW 5 | | | | | | | | | | | | | | | |
| FIFO ROW 6 | | | | | | | | | | | | | | | |
| FIFO ROW 7 | | | | | | | | | | | | | | | |
| FIFO ROW 8 | | | | | | | | | | | | | | | |
| FIFO ROW 9 | | | | | | | | | | | | | | | |
| FIFO ROW 10 | | | | | | | | | | | | | | | |
| FIFO ROW 11 | | | | | | | | | | | | | | | |
| FIFO ROW 12 | | | | | | | | | | | | | | | |
| FIFO ROW 13 | | | | | | | | | | | | | | | |
| FIFO ROW 14 | | | | | | | | | | | | | | | |
| . . . | | | | | | | | | | | | | | | |
| FIFO ROW 64 | | | | | | | | | | | | | | | |
| . . . | | | | | | | | | | | | | | | |
| FIFO ROW N | | | | | | | | | | | | | | | |

US 7,539,203 B2

MULTIPLE CHANNEL FLOW CONTROL WITH FIRST-IN-FIRST-OUT (FIFO) READ/WRITE RANDOM ACCESS MEMORY (RAM)

BACKGROUND

1. Field

Embodiments of the present invention relate to computing and networking, and, in particular, to flow control within computing and networking platforms.

2. Discussion of Related Art

A typical computing or networking platform has a number of nodes that pass information (data, video, audio, etc., in the form of packets or raw data, for example) among each other. When packets arrive at a node, such as a switch, a router, a bridge, etc., within the platform, the node may process the information in some manner and then pass the information to the next node.

One characteristic of computing and networking platforms is that the rate at which information is transferred out of nodes can fail to keep pace with the rate at which information arrives at the nodes. This is particularly true in today's high-end computing platforms and high-speed networking platforms. A node in the platform can be over-burdened or otherwise unable to accept information with sufficient speed. In this event, the platform might not be able to handle the resulting congestion, information can get dropped, and the platform's performance can become degraded.

Flow control mechanisms within the node are commonly used to control or regulate the movement of information from the input of a node to the output of the node. There are many known flow control mechanisms, but designers still face challenges to optimize them as platforms become faster and more powerful.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 3 is a diagram of the RAM first-in-first-out (FIFO) channels according to an embodiment of the present invention.

DETAILED DESCRIPTION OF THE ILLUSTRATED EMBODIMENTS

Figure 1:
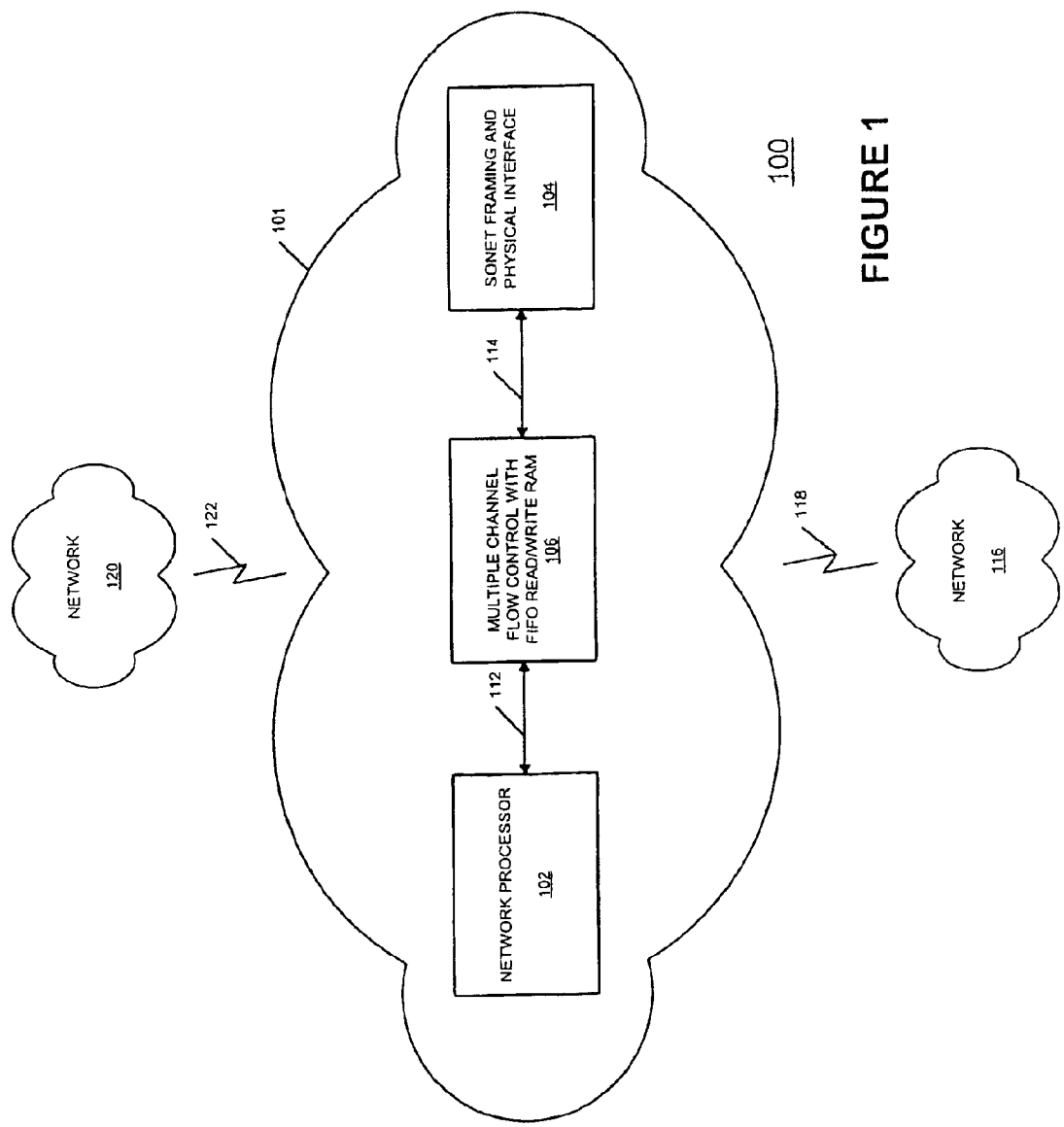
FIG. 1 is a high-level block diagram of a platform according to an embodiment of the present invention.

FIG. 1 is a high-level block diagram of a platform 100 according to an embodiment of the present invention. The platform 100 includes a network 101 that has a network processor 102, a synchronous optical network (SONET) framing and physical (PHY) interface 104, and a multiple channel flow control with first-in-first-out (FIFO) read/write random access memory (RAM) 106 (hereinafter "flow control 106") coupled between the network processor 102 and the interface 104. Of course, the network processor 102 and the interface 104 can be any data source or data sink that transmits and receives data whose flow is to be controlled by the flow control 106 and after reading the description herein, a person of ordinary skill in the relevant art will readily recognize how to implement embodiments of the present invention for other data sources and data sinks.

In the illustrated example embodiment, the flow control 106 is coupled to the network processor 102 on a link 112, and to the interface 104 on a link 114. The network processor 102 transmits data to and receives data from the flow control 106. The interface 104 transmits data to and receives data from the flow control 106.

In one embodiment, the network processor 102 transmits/receives data to/from the flow control 106 on multiple channels. The data can be in packet form or raw data (e.g., frame, fragment, cell). For example the data can be in asynchronous transfer mode (ATM), Ethernet, Generic Framing Procedure (GFP), Packet Over Synchronous Optical Network (SONET) (POS), Utopia, peripheral component interconnect (PCI) Express, PCI-X, or other suitable format. Of course, this list is not exhaustive and a person of ordinary skill in the relevant art will readily recognize how to implement embodiments of the present invention using other data formats.

In embodiments of the present invention, the network processor 102 can include Gigabit Ethernet, 10 Gigabit Ethernet, GFP, POS, Utopia interfaces, for example. Of course, there are other known interfaces suitable for implementing the network processor 102.

In one embodiment, the interface 104 transmits/receives data to/from the flow control 106 on multiple channels as well. The data can be in packet form or raw data (e.g., frame, fragment, cell). In the illustrated embodiment, the interface 104 transmits/receives SONET data and can translate between the physical signals carried by flow control 106 and the bits (i.e., ones and zeros) used by other digital devices in the platform 100. Of course, there are other known devices and/or applications suitable for implementing the interface 104.

In embodiments of the present invention, the links 112 and/or 114 can be System Packet Interface (SPI) interface (e.g., Level 4 (SPI-4), Level 3 (SPI-3) or a common switch interface (CSIX) interface, for example. Of course, embodiments of the present invention are not so limited and after reading the description herein a person of ordinary skill in the relevant art will readily recognize how to implement the links 112 and/or 114 using a variety of media (e.g., wireless media such as infrared, radio frequency (RF), microwave).

The network 101 can be a local area network (LAN), which is typically thought of as being limited to a specific geographic area, such as within a building or a campus. Workgroups within the network 101 often share the same resources, such as printers and applications.

Alternatively, the network 101 can be part of a metropolitan area network (MAN), which commonly includes two or more LANs networked together in a physical space roughly equivalent to a metropolitan area. A typical MAN is a high-performance public network.

In embodiments in which the network 101 is a LAN or a MAN, the platform 100 can be a wide area network (WAN) that spans a large geographic area with the network 101 coupled to a network 116 via a link 118, and with the network 101 coupled to a network 120 via a link 122. An example of a WAN is the Internet, and commonly includes the Public Switched Telephone Network (PSTN). The WAN can implement packet switching and circuit switching technologies. A private network also can be a WAN. For example, many companies have a corporate WAN that connects its many offices around the world. Each office may be a LAN and the WAN connects the LANs to each other.

In an alternative embodiment, the network processor 102, link 112, flow control 106, link 114, and interface 104 can be part of a router and can perform the functions of connecting separate networks together (e.g., the network 120 to the network 116), filtering traffic, and/or selecting the best route to a given destination from among several paths.

In another embodiment, the network processor 102, link 112, flow control 106, link 114, and interface 104 can be part of a switch. In this embodiment, the switch can perform the function of choosing a path across which to send traffic to its destination. The switch can forward a packet to a given destination before the entire packet has been received or can wait until the entire packet is received before forwarding to the destination. The switch can filter traffic, manage allocation of bandwidth for quality of service (QoS) implementations, perform load balancing, and/or select the best route to a given destination from among several paths.

In other embodiments, the network processor 102, link 112, flow control 106, link 114, and interface 104 can be part of a bridge. In this embodiment, the bridge can perform functions of connecting network segments, filtering traffic, and forwarding traffic to a given destination.

Of course, the network processor 102, link 112, flow control 106, link 114, and interface 104 can be part of a network interface circuit (NIC), a modem, an integrated services digital network (ISDN) adapter, a digital subscriber line (DSL) adapter, customer premises equipment (CPE), or other communication port or device (e.g., serial, parallel, USB, SCSI) that has traffic flowing from an input to an output. After reading the description herein a person of ordinary skill in the relevant art will readily recognize how to implement embodiments of the present invention for these and other such applications.

The link 118 and/or 122 can be a DSL, a T-carrier, a leased line, an ATM link, a frame relay link, an X.25 link, a switched multi-megabit data service (SMDS) link, satellite, cellular, or other suitable link.

Figure 2:
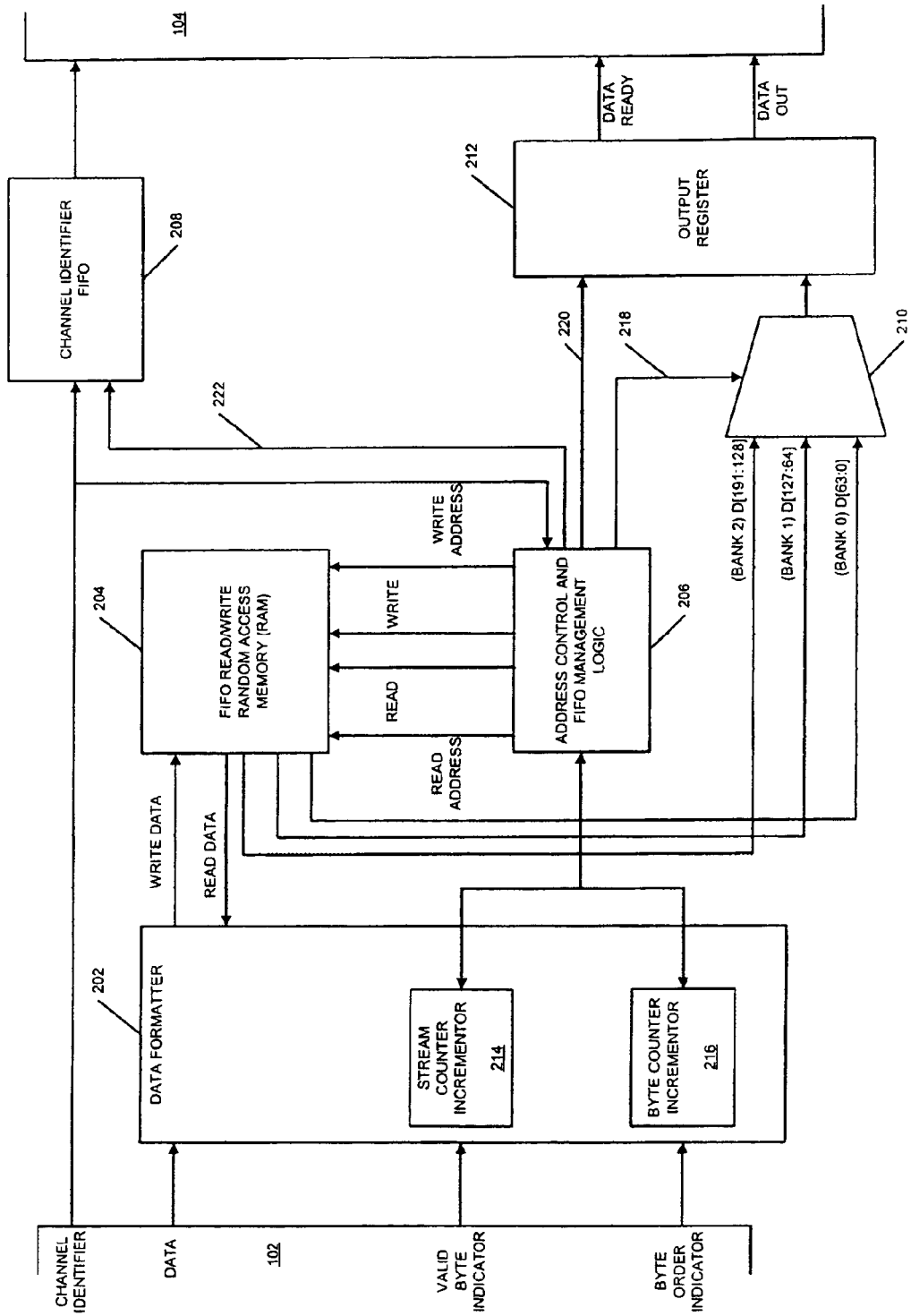
FIG. 2 is a schematic diagram showing the RAM-based multiple channel flow control depicted in FIG. 1 in more detail according to an embodiment of the present invention.

FIG. 2 is a schematic diagram showing the flow control 106 in more detail according to an embodiment of the present invention. In the embodiment illustrated in FIG. 2, the flow control 106 includes a data formatter 202 coupled to a FIFO read/write RAM 204 (hereinafter "RAM 204") and address control and FIFO management logic 206 (hereinafter "logic 206"). The logic 206 is coupled to a channel identifier FIFO 208 (hereinafter "FIFO 208"), a selector 210, and an output register 212. The selector 210 is coupled to the output register 212.

The data formatter 202 includes a stream counter incrementor 214 and a byte counter incrementor 216, both of which are coupled to the logic 206. The network processor 102, which transmits and receives data on multiple channels, couples a channel identifier for each channel to the FIFO 208 and data to the data formatter 202. In one embodiment, the network processor 102 or the link 112 couples a valid byte indicator to the data formatter 202. Optionally, the network processor 102 or the link 112 couples a byte order indicator and/or other suitable flow control signals to the data formatter 202. Unlike many flow control mechanisms, the data formatter 202, RAM 204, logic 206, FIFO 208, selector 210, output register 212, stream counter incrementor 214, and byte counter incrementor 216 are shared by and provide flow control for all channels.

For purposes of illustration, suppose that the network processor supports sixty-four (64) channels, the data path out of the network processor 102 is a fixed twelve (12) bytes wide, and the data path into the interface 104 is a fixed eight (8) bytes wide. Of course, some or all of these parameters can be programmed according to the particular application (e.g., ATM, Ethernet, GFP, POS, Utopia, PCI-X, etc.). The valid byte indicator can indicate the number of bytes in the twelve-byte data path that are valid and usable. The byte order indicator can indicate the order in which the bytes should be arranged. That is, the incoming data is rearranged using the valid byte indicator and the byte order indicator to place the payload between the start and end of the packet. The data formatter 202 rearranges the data using the valid byte indicator and/or the byte order indicator as needed.

In keeping with the illustration, FIG. 3 shows the RAM 204 in more detail according to an embodiment of the present invention. In the depicted embodiment, the RAM 204 is sixty-four (64) first-in-first-out (FIFO) rows deep, one for each channel, and two hundred bits wide. The two hundred (200) bits are partitioned with one hundred ninety-two (192) bits of data and eight bits for control. Each FIFO row includes a byte counter 302, a stream counter 304, a virtual bank 0, a virtual bank 1, and a virtual bank 2. Each bank 0-2 is eight bytes wide. The stream counter 304 is two bits wide and the byte counter 302 is five bits wide. The read address and write address for the RAM 204 are realized from the channel identifier. A read line and a write line are coupled between the logic 206 and the RAM 204 to control reading to and writing from the RAM 204. Of course, in embodiments, the stream counter 304 and the byte counter 302 can be implemented as a single counter.

The byte counter 302 can count the total number of valid bytes fed into the output register 212 and count in round-robin fashion from zero to twenty-three, then would roll over to zero. The byte counter 302 thus keeps track of the exact position of the data filled in a RAM 204 location during previous operations, and on a consequent write operation indicates a new valid byte count plus the previous byte count value.

The stream counter 304 can count every eight valid bytes and assists in partitioning the 192 bits into the three virtual banks 0-2. The stream counter 304 can count in round-robin fashion from 0, 1, 2, then roll over to 0. The value in the stream counter 304 is used to multiplex one of the banks 0-2 to be output to the output register 212. The value in the stream counter 304 also indicates which bank was last sent out to the output register 212.

Figure 4:
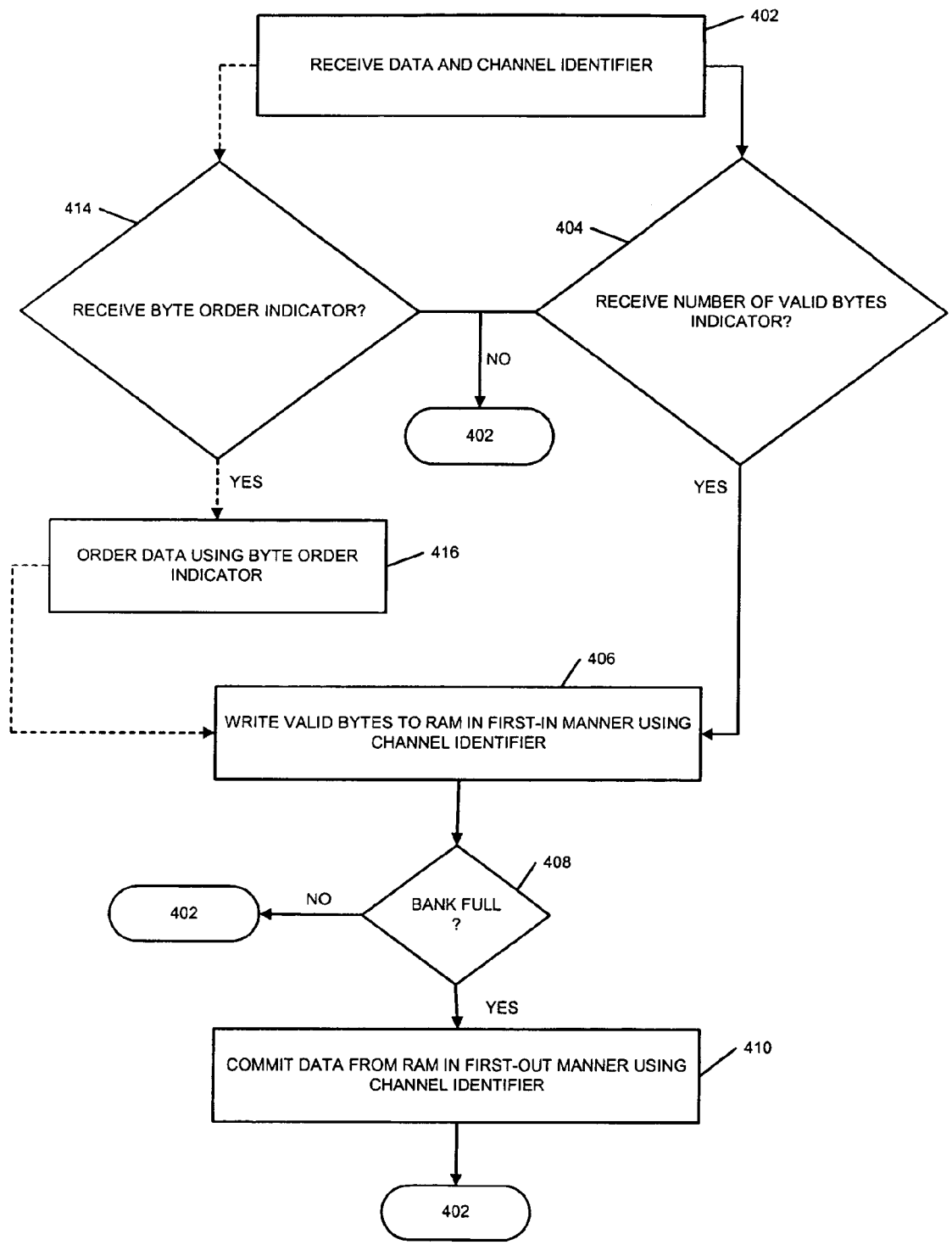
FIG. 4 is a flowchart illustrating an approach to implementing the RAM-based multiple channel flow control depicted in FIG. 3 according to an embodiment of the present invention.

FIG. 4 is a flowchart illustrating a process 400 implemented by the platform 100 according to an embodiment of the present invention. The operations of the process 400 are described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Of course, the process 400 is only an example process and other processes may be used to implement embodiments of the present invention. A machine-accessible medium with machine-readable instructions thereon may be used to cause a machine (e.g., a processor) to perform the process 300.

In a block 402, data along with the first channel identifier (e.g., channel 0) arrives at the flow control 106. In one embodiment, the platform 100 initializes (e.g., loads all FIFO rows of the RAM 204 with zeros) prior to receiving the data and channel identifier.

In a block 404, the data formatter 202 determines whether a number of valid bytes indicator has been received (e.g., on the first or subsequent channels). If a number of valid bytes indicator has not been received, then the process 400 returns to the block 402 to receive more data and another channel identifier.

If a number of valid bytes indicator has been received, then the process 400 passes to a block 406 in which the data formatter 202 writes the valid bytes into the RAM 204 in a first-in manner. Suppose in one embodiment that the number of valid bytes indicator indicates that there are four bytes of valid data in the received data on channel 0. In this embodiment, those four bytes are written in a first-in manner into FIFO row 0, bank 0 of the RAM 204. The logic 106 can use the channel identifier to read the RAM 204 contents in FIFO row 0. In embodiments in which the platform 100 has just been initialized, the byte counter 302 and the stream counter 304 indicate that there is no data at that RAM 204 location and that all four bytes may be written there.

In a block 408, the logic 206 determines whether a bank in the RAM 204 is full. If the logic 206 determines that a bank in the RAM 204 is not full, then the process 400 returns to the block 402 to receive more data and another channel identifier. In embodiments in which bank 0 can accommodate eight bytes, bank 0 is only half full at this point in the process 400 and thus the process 400 returns to the block 402 to receive more data and another channel identifier. The byte counter 302 is incremented to four (by the byte counter incrementor 216) and the stream counter 304 remains at zero.

Suppose in the next cycle of the block 402 that five valid bytes along with the channel identifier for channel 0 arrive at the flow control 106. In this embodiment, the stream counter 304 value is incremented to point to bank 1 and the byte counter 302 value is incremented to nine (e.g., the new valid byte count of five plus the previous byte count of four). There are eight bytes now available in bank 0. Thus in the next performance of the block 408 the logic 206 determines that bank 0 is full and the process 400 passes to a block 410.

In the block 410, data are committed to its data sink in a first-out manner. Following the illustrated embodiment, eight bytes (e.g. full bank) of data are committed to its data sink in a first-out manner from FIFO row 0, bank 0 of the RAM 204. In one embodiment, the logic 106 can use the channel identifier to generate the RAM 204 write address. The logic 106 can also provide the previous stream counter 304 value of zero to the selector 210.

In one embodiment, in the next clock cycle the eight bytes of data and the channel identifier from the FIFO 208 (e.g., provided by the logic 206 to the FIFO 208 on a line 222) are sent to the output register 212 along with a data ready flag 220. Alternatively, the data ready flag 220 can be set to other values to indicate that data is available for other clock periods, e.g., to allow for data pipelining. The logic 206 can perform a read-modify-write such that when data is read out of row 0 of the RAM 204, the stream counter incrementor 214 and the byte counter incrementor 216 increment the stream counter 304 and the byte counter 302, respectively.

Thus, in embodiments of the present invention, the data path is concatenated with the previous contents of the RAM 204 and written back into the same location of RAM 204 with updated control signals. The channel number points to the location. Once the required width of data is realized using the read-modify-write technique, then the data along with the control signals are passed on to the output register 212. This makes the flow control 106 simple and saves logic and space.

After completion of the block 410, the process 400 returns to the block 402 to receive more data and another channel identifier. In one embodiment, the data formatter 202 receives data and a channel identifier on channel 2 from the network processor 102 and the process 400 is performed on that data (e.g., the logic 106 writes and reads valid bytes to/from FIFO row 2 of the RAM 204). In another embodiment, the data formatter 202 receives data and a channel identifier on channel 10 from the network processor 102 and the process 400 is performed on that data (e.g., writes and reads valid bytes to/from FIFO row 10 of the RAM 204). After reading the description herein, a person of ordinary skill in the relevant art will readily recognize how to implement embodiments of the present invention for other channels.

In embodiments of the invention, data may arrive at the flow control 106 with bytes out of order. The flow control 106 handles both the control signal path (e.g., byte order indicator, number of valid bytes indicator) and the data path. The dotted lines in the flowchart in FIG. 4 illustrate these optional operations of the process 400.

For example, in a block 414, the data formatter 202 determines whether a byte order indicator has been received. If a byte order indicator has not been received, then the process 400 performs block 402. If, on the other hand, a byte order indicator has been received, then in a block 416, the data formatter 202 orders the data according to the byte order indicator for that channel. The process 400 then performs block 406 as described above.

Figure 5:
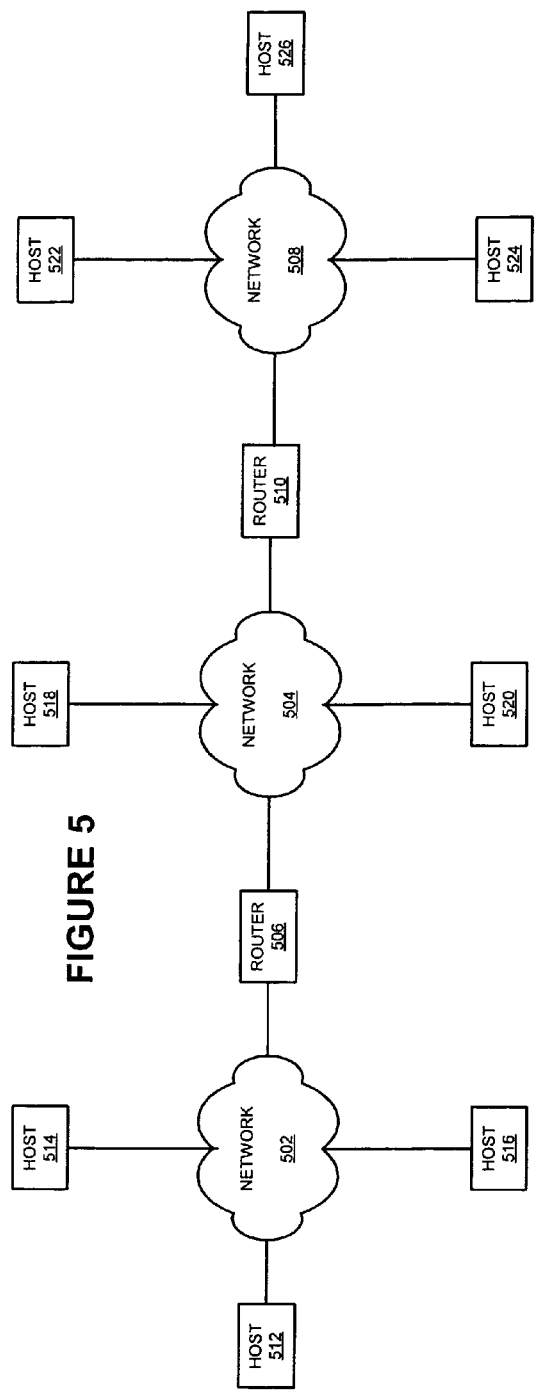
FIG. 5 is a high-level block diagram of an architecture according to an alternative embodiment of the present invention.

FIG. 5 is a high-level block diagram of an architecture 500 (e.g., an Internet architecture) according to an alternative embodiment of the present invention. The illustrated architecture 500 includes a network 502 coupled to a network 504 via a router 506. A network 508 is coupled to the network 504 via a router 510. The networks 502, 504, and 508 can be similar to the network 101.

Several hosts 512, 514, 516 are coupled to the network 502, hosts 518 and 520 are coupled to the network 504, and hosts 522, 524, and 526 are coupled to the network 508. The hosts 512, 514, 516, 518, 520, 522, 524, and 526 can be conventional computers attached to the architecture 500 in an effort to communicate with each other or other computers attached to the architecture 500. Accordingly, the hosts 512, 514, 516, 518, 520, 522, 524, and 526 can be a large mainframe computer (e.g., a server), a desktop system, a hand-held device (e.g., a personal digital assistant (PDA)), an embedded control system, or the like.

Figure 6:
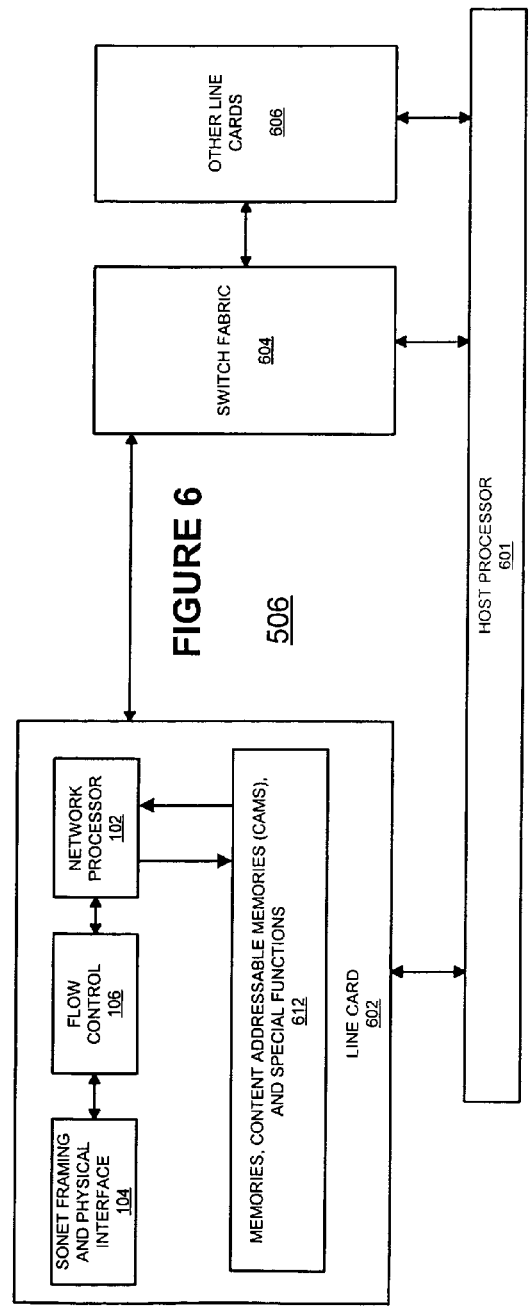
FIG. 6 is a high-level block diagram of the router depicted in FIG. 5 according to an embodiment of the present invention.

FIG. 6 is a high-level block diagram of the router 506 (or the router 510) according to an embodiment of the present invention. In the illustrated embodiment, the router 506 includes a host processor 601 coupled to a line card 602, a switch fabric 604, and other line cards 606. The line card 602, other line cards 606, and the switch fabric 604 are coupled to the host processor 601.

Also in the illustrated embodiment, the line card 602 includes the network processor 102, the SONET framing and physical interface 104, and the flow control 106 coupled between them. The line card 602 also can include memories, content addressable memories (CAMs), and special functions circuitry 612.

The host processor 601 controls the operations of the line card 602, switch fabric 604, and other line cards 606.

Circuitry suitable for implementing the memories, content addressable memories (CAMs), and special functions circuitry 612 according to embodiments of the present invention is known and as such will not be described in further detail herein.

In embodiments of the present invention, the switch fabric 604 can be any switch fabric (e.g., crossbar, shared memory switch fabric). The switch fabric, for example, may conform to CSIX or other fabric technologies such as HyperTransport, Infiniband, PCI-X, PCI-Express, Packet-Over-SONET, RapidIO, and Utopia.

Although embodiments of the present invention are described with reference to the network processor 102 providing "data," it is to be understood that the network processor 102 can also provide voice, audio, video, graphics, animation, multimedia, etc. Data can be fixed width or variable width. When data is variable width the start and end of a packet can be flagged. In the end of packet condition the data path will not be fixed but can vary. The valid byte indicator can indicate the number of valid bytes on the data path. The data path would be fixed during the payload bytes and would have all the bytes valid in the data path.

Although embodiments of the present invention are described with reference to the RAM 204 having sixty-four channels, embodiments of the present invention can have any number of channels (e.g., N channels). After reading the description herein, a person of ordinary skill in the relevant art will readily recognize how to implement embodiments of the present invention using greater than or fewer than sixteen channels.

Although embodiments of the present invention are described with reference to the RAM 204 having three banks, embodiments of the present invention can have any number of banks (e.g., N banks, as indicated by the ellipses). After reading the description herein, a person of ordinary skill in the relevant art will readily recognize how to implement embodiments of the present invention using greater than or fewer than three banks.

Although embodiments of the present invention are described with reference to the RAM 204 having banks that are eight bytes wide, embodiments of the present invention can have any number of bytes (e.g., N bytes). After reading the description herein, a person of ordinary skill in the relevant art will readily recognize how to implement embodiments of the present invention using greater than or fewer than eight bytes partitioned into greater or fewer than four-byte segments.

Although embodiments of the present invention are described with reference to the stream counter 304 being two bits wide and the byte counter 302 being five bits wide, in embodiments of the present invention, the stream counter and/or the byte counter can be any number of bits. After reading the description herein, a person of ordinary skill in the relevant art will readily recognize how to implement embodiments of the present invention using various counter widths.

Although embodiments of the present invention are described with reference to the transmit direction, embodiments of the present invention can operate in the receive direction as well. For example, the interface 104 can transmit to the flow control 106 and the flow control 106 can transmit to the network processor 102. After reading the description herein, a person of ordinary skill in the relevant art will readily recognize how to implement embodiments of the present invention using greater than or fewer than three banks.

In alternative embodiments of the present invention, data arriving at the flow control 106 can have variable widths. In these embodiments, extra control signals (i.e., other than number of valid bytes indicator and byte order indicator) can flag the start and end of a packet. In the end of packet condition, the data path from the network processor 102 can vary and the control path can notify the data formatter of the number of valid bytes on the data path. The network processor 102 data path can be fixed during the payload bytes and all bytes in the data path can be valid.

Embodiments of the present invention may be implemented using hardware, software, or a combination thereof. In implementations using software, the software may be stored on a machine-accessible medium.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as well as electrical, optical, acoustic, or other form of propagated signals (e.g., carrier waves, infrared signals, digital signals, etc.).

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method, comprising:

receiving from a data source a first data on a first channel and a second data on a second channel;

receiving a first channel identifier and a second channel identifier, the first channel identifier to identify the first channel and the second channel identifier to identify the second channel;

determining a first memory write address for a first row in a memory using the first channel identifier;

determining a second memory write address for a second row in the memory using the second channel identifier;

reading at least a first counter in the first row to determine a bank in the first row into which to write the first data;

reading at least a second counter in the second row to determine a bank in the second row into which to write the second data;

writing in a first-in (FI) manner the first data to the first row in the memory and the second data to the second row in the memory, the first channel identifier to identify the first row and the second channel identifier to indicate the second row, wherein each channel is associated with its own row in the memory;

reading in a first-out (FO) manner the first data from the first row and the second data from the second row; and making the first data and the second data available for access to at least one data sink.

2. The method of claim 1, further comprising:

reading the first counter to determine a byte location in the first row into which to write the first data; and reading the second counter to determine a byte location in the second row into which to write the second data.

3. The method of claim 2, further comprising:

reading the first counter to determine that the data in the first row is available for access by the data sink;

using the first channel identifier to determine a memory read address for the first row; and reading the first counter to determine the bank in the first row is written data available for access by the data sink.

4. The method of claim 2, further comprising:

reading the second counter to determine that the data in the second row is available for access by the data sink;

using the second channel identifier to determine a memory read address for the second row; and reading the second counter to determine the bank in the second row is written data available for access by the data sink.

5. The method of claim 1, further comprising:

receiving a first byte order indicator for the first data;

ordering the first data according to the first byte order indicator;

reading a counter to determine that the data in the first row is available for access by the data sink; and making available to the data sink in a first-out manner the first ordered data.

6. The method of claim 1, further comprising:

receiving a number of valid bytes indicator for the first data; and writing to the first row in the first-in (FI) manner a number of valid bytes as indicated by the number of valid bytes indicator.

7. The method of claim 1, further comprising:

receiving a number of valid bytes indicator for the second data; and writing to the second row in the first-in (FI) manner a number of valid bytes as indicated by the number of valid bytes indicator.

8. An apparatus, comprising:

logic to receive a first data on a first channel, a second data on a second channel, a first channel identifier to identify the first channel, a second channel identifier to identify the second channel;

a memory having at least a first row and a second row, each row to be written in a first-in (FI) manner and to be read in a first-out (FO) manner, the first data to be written to and read from the first row and the second data to be written to and read from the second row, the first channel identifier to identify the first row and the second channel identifier to indicate the second row, wherein each channel is associated with its own row in the memory;

a first indicator to indicate a byte order for the first data or a second indicator to indicate a byte order for the second data; and second logic to order the first data according to the first indicator or the second data according to the second indicator.

9. The apparatus of claim 8, further comprising second logic to determine a first memory read/write address for the first row using the first channel identifier and to determine a second memory read/write address for the second row using the second channel identifier.

10. The apparatus of claim 9, further comprising:

a first counter to indicate a bank in the first row into which to write the first data; and a second counter to a byte location in the first row into which to write the first data.

11. The apparatus of claim 8, further comprising a signal to indicate a number of valid bytes in the first data.

12. The apparatus of claim 8, further comprising a signal to indicate a number of valid bytes in the second data.

* * * * *